March 30, 1948.　　　　J. DAVIS　　　　2,438,546
UTENSIL
Filed Jan. 9, 1946　　　3 Sheets-Sheet 1

INVENTOR
JOSEPH DAVIS
BY
ATTORNEY

March 30, 1948.    J. DAVIS    2,438,546
UTENSIL
Filed Jan. 9, 1946    3 Sheets-Sheet 2

INVENTOR.
JOSEPH DAVIS
BY
ATTORNEY.

March 30, 1948.                J. DAVIS                2,438,546
                                UTENSIL
                          Filed Jan. 9, 1946          3 Sheets-Sheet 3
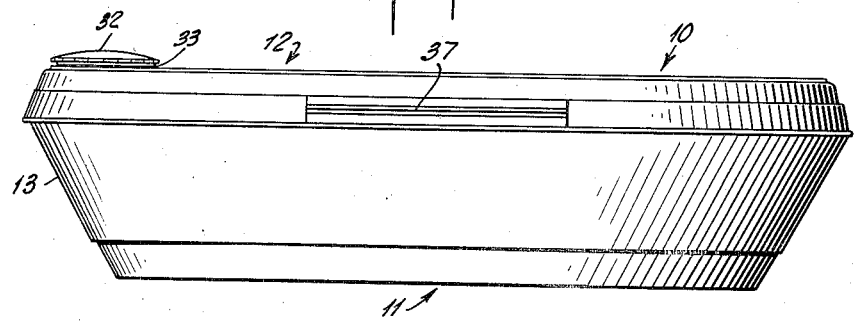
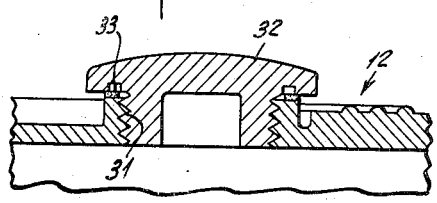
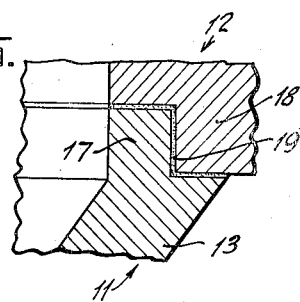
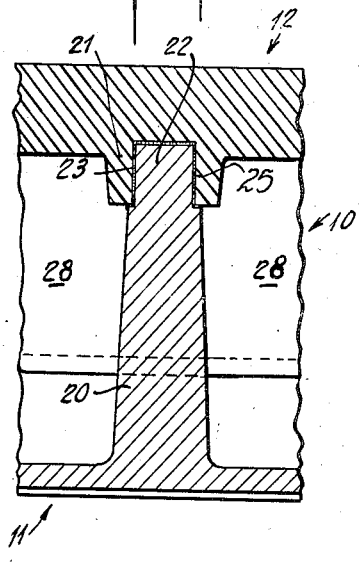
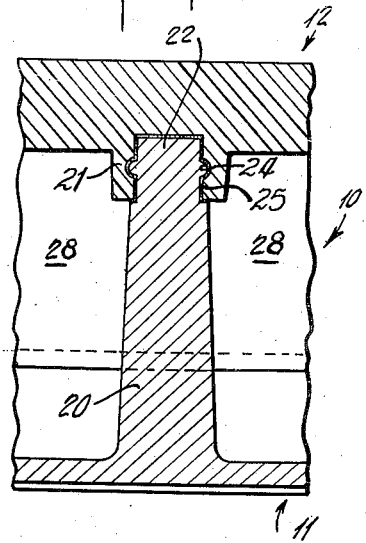
INVENTOR
JOSEPH DAVIS
BY
ATTORNEY Patented Mar. 30, 1948

2,438,546

UNITED STATES PATENT OFFICE 2,438,546

UTENSIL

Joseph Davis, South Orange, N. J., assignor to Joseph Davis Plastics Co., Arlington, N. J., a corporation of New Jersey Application January 9, 1946, Serial No. 640,127

2 Claims. (Cl. 65—15)

This invention relates to improvements in thermal utensils, such as hot water dishes which are provided with a compartment for the reception of hot water or similar heating medium. It is the object of the invention to provide such a utensil which may be made of plastic composition, designed and assembled as to have a fully sealed thermal compartment and inherently resisting any tendency to warpage or distortion due to conditions encountered in use.

These and other advantageous objects, which will later appear, are accomplished by the structure shown and illustrated in the accompanying drawings, in which:

Fig. 3 is a side elevational view taken at the designation of the Fig. 3 arrow of Fig. 1, Fig. 4 is a fragmentary, sectional view taken on line 4—4 of Fig. 1, Fig. 5 is a fragmentary, enlarged sectional view taken on line 5—5 of Fig. 2, Fig. 6 is a fragmentary, enlarged portion of Fig. 2, and Fig. 7 is a similar fragmentary, sectional view of another form of the invention.

Figure 1:
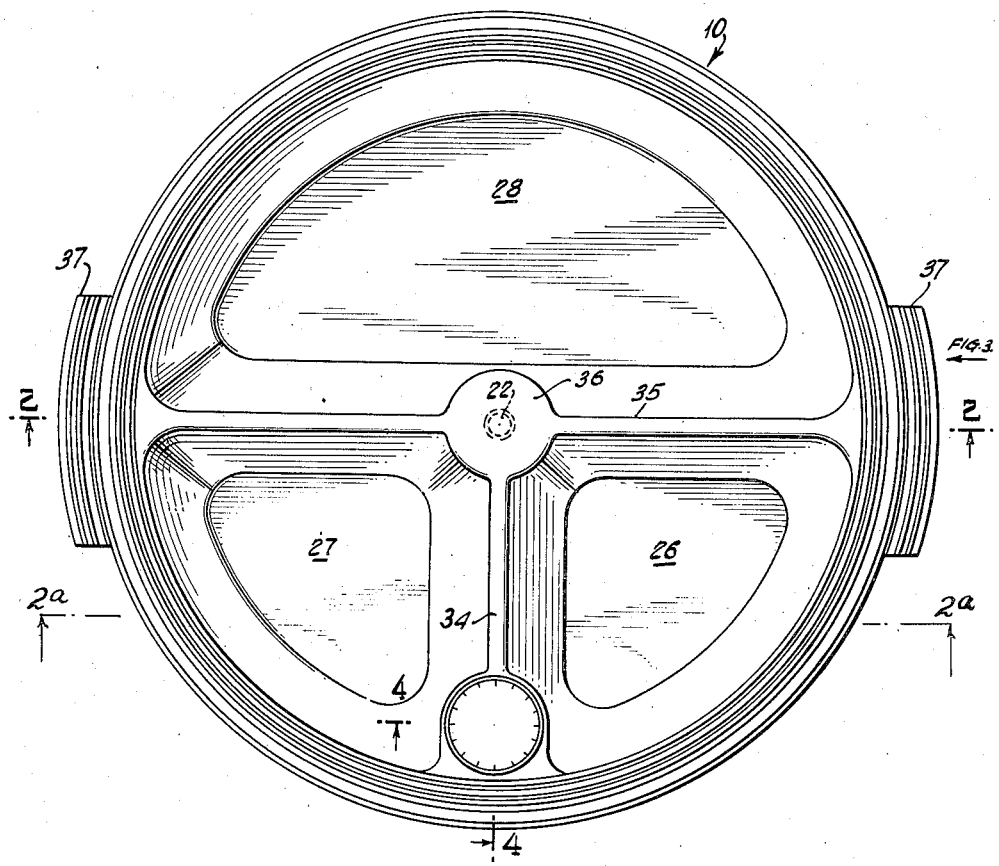
Figure 1 is a top plan view of a utensil embodying the invention.
Figure 2:
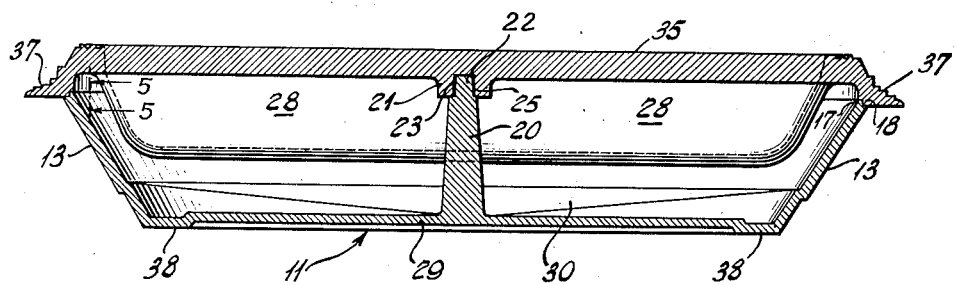
Fig. 2 is a transverse, sectional view thereof taken on line 2—2 of Fig. 1.
Figure 2A:
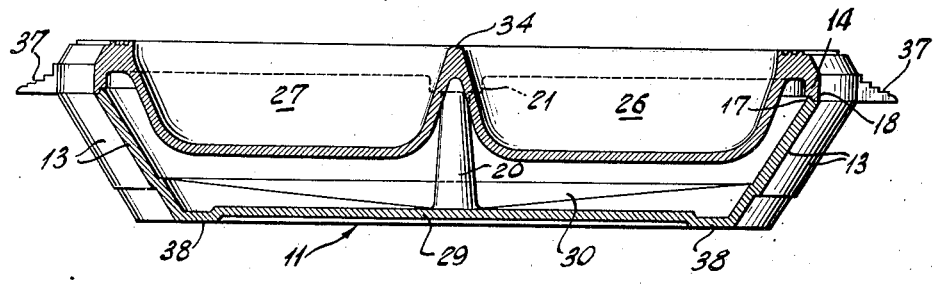
Fig. 2a is a transverse, sectional view taken on line 2a—2a of Fig. 1.

In the form of invention shown in the accompanying drawings, the utensil 10 comprises a lower shell member or section 11 and an upper shell member or section 12, said shell members being provided with complementarily directed peripheral flanges 13 and 14 respectively. The flanges 13 and 14 are provided at their edges with interlocking parts, such as stepped shoulders 17 and 18 respectively (see Fig. 5). By this arrangement, the interlocking parts of the upper and lower shell members present uniting marginal surfaces which are substantially greater than the cross-section of the narrower of said rim members. This construction provides a means for circumferentially interlocking the shell members in a positive manner while permitting of the use of rim members of relatively thin cross-section. To further assure the interlocking of the shell members circumferentially at their marginal edges and to preclude the escape therefrom of water (or other thermal means which may be inserted intermediate said shell members as hereinafter described) the interlocking marginal parts are preferably coated with cement or adhesive 19 prior to their being brought together, to firmly unite them for the purpose above set forth. It will be apparent that the stepped, interlocking portions 17 and 18 may assume any other irregular outline which will assure the interlocking of the parts and will provide a substantial interlocking and sealing surface.

The shell members 11 and 12 are provided with a stud 20 medially projecting from one of said shell members (as for example, from the lower shell member 11) and adapted to be received within a medial socket member 21 provided on the other shell member (such as the upper shell member 12 to medially interlock the parts). Said registering members 20, 21 are directed toward the opposite shell sections. The stud 20 is preferably provided with a shouldered, reduced boss 22, adapted to be received in the medial recess 23 of the socket 21 to interlock the parts medially. If desired, the boss 22 and medial recess 23 of the socket 21 may be provided with supplementary, complementary interlocking means 24 as shown in Fig. 7, disposed at a plane at right angles to the longitudinal axis of the stud 20. Said means may comprise, as shown in Fig. 7, a circumferential rib provided on the boss 22 for reception in a corresponding groove in the socket 21. The meeting edges of the socket 21 and boss 22 may be coated with a cement or adhesive 25 before said parts are brought together, to further unite the same.

By the structure described, it will be apparent that the utensil of my invention is provided with means for medially and circumferentially uniting the two sections thereof to form a substantially unitary, sealed, homogeneous structure. The upper section 12 may be provided with concave portions 26, 27 and 28 for convenience in holding foods of different kinds. The concave portions have dividing ribs 34, 35 defining the inner walls of said concave portions 26—28, said ribs being united at 36 at the center of the utensil 10. The concave portions 26—28 are so proportioned, that when the parts are assembled as above described, they will, with the flat portion 29 of the lower shell member 11 define a hollow compartment or space 30 within which a thermal medium, such as water, may be introduced, as through an opening 31 in one of the shell members, said opening being normally closed by a cap 32 which may have threaded engagement therewith (as shown in Fig. 4) and which may be provided with a rubber or other washer 33 to further seal said opening.

The shell members may be provided with handles 37 formed unitarily with one of the shell members and projecting beyond the circumference thereof.

The structure of my invention enables the utilization of plastic materials, which are highly sanitary, light and economical, for the manufacture of utensils and provides a structure well adapted for the intended use. It will be apparent from a consideration of the foregoing description that the upper and lower shell members may be molded in a convenient manner and that the engaging parts thereof as above described may be economically formed in the molding operation. The device is of inherent rigidity and may be economically manufactured of plastic material.

The bottom 29 of said utensil 10 may terminate in an annular stepped portion 38 to normally provide an air space intermediate said bottom and flat surfaces on which the utensil 10 is positioned. The structure shown in the drawings is adapted to be used as a hot water dish; when so used, as will be apparent from the foregoing description, the structure will resist distortion and warpage by virtue of the interlocking, reinforced medial and circumferential features thereof above described.

In dishes of this character formed solely of plastic compositions the thermal distortion under temperature changes is unpredictable and a combination of both medial and circumferential interlock when the two shells that form the utensil are assembled is necessary to produce a durable and efficient article of this character.

Having thus described my invention what I claim as new and desire to secure by Letters Patent, is:

1. A dish for maintaining food at a desired temperature comprising an upper shell having downwardly extending food receiving recesses and a depending circumferential flange and a lower shell cooperating therewith to form a compartment for a removable thermal medium, said shells being formed of a molded plastic composition subject to irregular distortion under temperature changes, the lower shell including a flared upstanding circumferential flange, complementary steps on the meeting edges of said flanges for interlocking engagement when the shells are assembled, an inner stud medially fixed to one shell, an inner socket medially fixed to the other shell and engageable with the end of the stud when the shells are assembled whereby the shells are interlocked medially for mutual support against distortion, said upper shell having an opening, and a plug for closing the same.

2. The structure as recited in claim 1 with cementing means interposed between the complementary steps on the meeting edges of the flanges of the shells and the engaged portions of the stud and socket.

JOSEPH DAVIS.

REFERENCES CITED

The following references are of record in the file of this patent:

UNITED STATES PATENTS

| Number | Name | Date |
| --- | --- | --- |
| 24,636 | Smith | July 5, 1859 |
| Re. 10,609 | Bennett | June 16, 1885 |
| 455,516 | Pfeffer et al. | July 7, 1891 |
| 697,247 | Harris | Apr. 8, 1902 |
| 1,989,329 | McDonald | Jan. 29, 1935 |
| 2,322,665 | Ryan | June 22, 1943 |
| 2,324,351 | Baker | July 13, 1943 |
| 2,329,279 | Lower | Sept. 14, 1943 |
| 2,353,383 | Bartsch | July 11, 1944 |

FOREIGN PATENTS

| Number | Country | Date |
| --- | --- | --- |
| 2,585 | Great Britain | Feb. 1, 1898 |